United States Patent
Harda et al.

(10) Patent No.: US 10,035,491 B2
(45) Date of Patent: Jul. 31, 2018

(54) METHOD FOR CONTROLLING A TIME OF ACTIVATION OF A REVERSIBLE RESTRAINT SYSTEM IN A VEHICLE

(71) Applicant: VOLVO CAR CORPORATION, Gothenburg (SE)

(72) Inventors: Peter Harda, Torslanda (SE); Anders Axelson, II, Torslanda (SE); Stefan Berge, Vastra Frolunda (SE); Par Nilsson, Molndal (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/925,107

(22) Filed: Oct. 28, 2015

(65) Prior Publication Data
US 2016/0129881 A1   May 12, 2016

(30) Foreign Application Priority Data
Nov. 6, 2014 (EP) .................................... 14192040

(51) Int. Cl.
*B60R 22/48* (2006.01)
*B60R 21/01* (2006.01)
*B60R 21/013* (2006.01)

(52) U.S. Cl.
CPC .............. *B60R 22/48* (2013.01); *B60R 21/01* (2013.01); *B60R 21/013* (2013.01);
(Continued)

(58) Field of Classification Search
CPC ....... B60R 22/48; B60R 21/01; B60R 21/013; B60R 2021/01272; B60R 2022/4825; B60R 2021/01317
See application file for complete search history.

(56) References Cited

U.S. PATENT DOCUMENTS 4,655,312 A * 4/1987 Frantom ................. B60R 22/44
                                                  180/268
5,004,178 A * 4/1991 Kobayashi .............. B60R 21/01
                                                  242/374
(Continued)

FOREIGN PATENT DOCUMENTS

EP       2036781 A1    3/2009
EP       2743142 A1    6/2014

OTHER PUBLICATIONS

Extended European Search Report dated Feb. 24, 2015, Application No. 14192040.5-1503, Applicant Volvo Car Corporation, 4 Pages.

*Primary Examiner* — John Olszewski
*Assistant Examiner* — Thomas E Worden
(74) *Attorney, Agent, or Firm* — Brooks Kushman P.C.

(57) ABSTRACT

The present disclosure relates to a method for controlling a time of activation of a restraint system in a vehicle, the vehicle comprising a seat belt associated to a seat, the restraint system being a reversible restraint system, the method comprising the steps of
a) determining a current length (L) of pulled out seat belt,
b) detecting a collision or an imminent collision involving the vehicle,
c) predicting a time ($T_O$) when the collision is predicted to affect a user of the seat belt,
d) activating the reversible restraint system a selectable time period ($\Delta_1$) before the time ($T_O$) when the collision is predicted to affect the user of the seat belt, wherein a length of the selectable time period ($\Delta_1$) is a function of the determined current length (L) of pulled out seat belt. The disclosure further relates to a safety arrangement of a vehicle.

21 Claims, 4 Drawing Sheets

(52) U.S. Cl.
CPC ............... *B60R 2021/01272* (2013.01); *B60R 2021/01317* (2013.01); *B60R 2022/4825* (2013.01)

(56) References Cited

U.S. PATENT DOCUMENTS

| | | | | |
|---|---|---|---|---|
| 5,087,075 A * | 2/1992 | Hamaue | ................. | B60R 22/44 242/375.1 |
| 5,184,845 A * | 2/1993 | Omura | ................. | B60R 21/276 280/735 |
| 5,398,185 A * | 3/1995 | Omura | .............. | B60R 21/01538 180/268 |
| 5,552,986 A * | 9/1996 | Omura | ................... | B60R 21/01 180/268 |
| 6,109,697 A * | 8/2000 | Lane, Jr. | ............... | B60R 22/195 297/464 |
| 6,213,512 B1 * | 4/2001 | Swann | .................... | B60R 22/46 180/271 |
| 6,260,880 B1 * | 7/2001 | Hada | ......................... | B60T 7/22 180/268 |
| 6,276,716 B1 * | 8/2001 | Kato | ..................... | B60R 21/233 280/729 |
| 6,443,488 B1 * | 9/2002 | Kippelt | ............. | B60R 21/01554 280/735 |
| 6,447,012 B2 * | 9/2002 | Peter | .................... | B60R 22/343 180/268 |
| 6,485,057 B1 * | 11/2002 | Midorikawa | ........... | B60R 21/01 280/801.1 |
| 6,811,182 B2 * | 11/2004 | Kobayashi | .......... | B60R 21/0132 280/735 |
| 6,846,019 B2 * | 1/2005 | Tobata | .................. | B60R 21/013 280/806 |
| 7,164,117 B2 * | 1/2007 | Breed | ............... | B60R 21/01516 250/208.1 |
| 7,204,334 B2 * | 4/2007 | Nobusawa | ........ | B60R 21/01546 180/268 |
| 2002/0079689 A1 * | 6/2002 | Motozawa | ........... | B60N 2/4221 280/806 |
| 2004/0066027 A1 * | 4/2004 | Ingemarsson | ....... | B60R 21/0134 280/805 |
| 2004/0113409 A1 * | 6/2004 | Ingemarsson | ....... | B60R 21/0134 280/806 |
| 2006/0071537 A1 * | 4/2006 | Tanaka | .................... | B60R 22/44 297/477 |
| 2006/0237960 A1 * | 10/2006 | Kudo | .................... | B60R 21/013 280/806 |
| 2007/0018445 A1 * | 1/2007 | Inuzuka | ................. | B60R 22/44 280/806 |
| 2007/0114768 A1 * | 5/2007 | Lennir | ............. | B60R 21/01548 280/735 |
| 2007/0257474 A1 * | 11/2007 | Eschbach | .......... | B60R 21/01516 280/735 |
| 2009/0108117 A1 * | 4/2009 | Iura | ..................... | B60R 22/3413 242/396.2 |
| 2014/0009276 A1 * | 1/2014 | Backhouse | ............ | B60Q 9/008 340/436 |
| 2014/0158806 A1 * | 6/2014 | Harda | .................... | B60R 21/01 242/384 |
| 2015/0298621 A1 * | 10/2015 | Katoh | .................... | B60R 11/04 348/148 |
| 2016/0101779 A1 * | 4/2016 | Katoh | ....................... | G06T 7/60 340/435 |
| 2016/0129881 A1 * | 5/2016 | Harda | ................... | B60R 21/013 701/45 |

* cited by examiner

A METHOD FOR CONTROLLING A TIME OF ACTIVATION OF A REVERSIBLE RESTRAINT SYSTEM IN A VEHICLE

CROSS-REFERENCE TO RELATED APPLICATIONS

This application claims foreign priority benefits under 35 U.S.C. § 119(a)-(d) to European patent application number EP 14192040.5, filed Nov. 6, 2014, which is incorporated by reference in its entirety.

TECHNICAL FIELD

The present disclosure relates to a method for controlling a time of activation of a reversible restraint system in a vehicle, the vehicle comprising a seat belt associated to a seat and the restraint system. The disclosure further relates to a safety arrangement of a vehicle and to a vehicle.

BACKGROUND

A modern vehicle, such as a car, is provided with safety arrangements in order to prevent or avoid injury to a seat occupant of the vehicle in case of an accident. It is well-known to use a safety arrangement comprising a seat belt for restraining the movement of the seat occupant in case of a sudden change of speed of the vehicle. Yet, a modern seat belt permits the seat occupant to move during normal driving conditions or when the vehicle stands still by adjusting the used length of the seat belt according to the movements of the seat occupant, e.g., when the seat occupant leans forwards.

It is known to use a retractor to suddenly and forcefully retract the seat belt in case of a collision or imminent collision being detected, since it is beneficial for the seat occupant to be located close to a seat back and a headrest in such a situation. The sudden and forceful retraction of the seat belt may be uncomfortable for the seat occupant, and may even cause a minor injury to the seat occupant. However, the advantages of being seated close to the seat back and headrest in case of a collision outweigh any discomfort or minor injury.

It is also known to reposition a seat or a portion of the seat, e.g., the seat back, in order to bring the seat occupant into a more favorable position. Purely as an example, if the seat back is inclined backwards, it may be beneficial to move it to a more upright position, e.g., in case of a rear-end collision.

Document EP 2 743 142 A1 discloses a method for retracting a seat belt of a vehicle, the method comprising the steps of determining an excessive length $L_A$ of pulled out seat belt, the excessive length $L_A$ of pulled out seat belt being the difference between the current length L and the minimum length $L_{min}$ of pulled out seat belt, when the seat belt is in use, and in case of detecting a collision or and/or a risk situation involving the vehicle, retracting the seat belt by applying a refraction force F, the retraction force F being a function of the excessive length $L_A$ of pulled out seat belt.

According to document EP 2 743 142 A1, the length of pulled out seat belt is utilized for determining a magnitude of the retraction force. In an embodiment, it is shown that the retraction force may, at least partly, be increasing as a function of the excessive length $L_A$ of pulled out seat belt. This means that a higher force will be used if the seat occupant is far from the seat back, as compared to if the seat occupant is close to the seat back.

SUMMARY

An object of the present disclosure is to overcome or ameliorate at least one of the disadvantages of the prior art, or to provide a useful alternative.

It is desirable to provide a method for controlling a time of activation of a reversible restraint system of a vehicle.

It is further desirable to provide a method being able to avoid unnecessary activations of the reversible restraint system.

Thus, in a first aspect of the present disclosure there is provided a method for controlling a time of activation of a restraint system in a vehicle, the vehicle comprising a seat belt associated to a seat and the restraint system, the restraint system being a reversible restraint system. The method comprises the steps of:

a) determining a current length of pulled out seat belt,
b) detecting a collision or an imminent collision involving the vehicle,
c) predicting a time when the collision is predicted to affect a user of the seat belt,
d) activating the reversible restraint system a selectable time period before the time when the collision is predicted to affect the user of the seat belt, wherein a length of the selectable time period is a function of the determined current length of pulled out seat belt.

The vehicle comprises at least one seat having an associated seat belt, i.e., the seat belt is intended to be used by an occupant of that seat, i.e., a user of the seat belt. The seat belt may be attached to the seat and/or to a vehicle body adjacent to the seat.

The seat belt is intended to protect the seat belt user in case of a collision involving the vehicle, but there is also provided at least one reversible restraint system in the vehicle, which reversible restraint system may cooperate with the seat belt to protect the seat occupant or which may function independently of the seat belt. The reversible restraint system may e.g., comprise a seat belt retractor or a seat back inclination adjustment arrangement. Both of these examples are associated to the seat, i.e., they are located in or at the seat and the restraint system is intended to be used by the occupant of that seat. Other reversible restraint systems do not form part of the seat arrangement but are anyway intended to protect the seat occupant. Purely as an example, a reversible restraint system may be used to adjust the position of the steering wheel, to adjust the position of a pedal and/or to adjust the position of the dashboard in relation to the seat occupant.

The correctness of the prediction of a collision increases in general the closer to the time $T_0$ the prediction is made, the time $T_0$ being the time when the collision is predicted to affect the user of the seat belt. However, the actual shape of the curve showing the correctness as a function of time may vary, e.g., dependent on sensor type and/or environmental conditions. Hence, a late activation of a reversible restraint system reduces the risk of activating it incorrectly. Further, unnecessary activation may cause a nuisance to the seat occupant. If waiting until the time $T_0$ is reached, i.e., until the collision is actually affecting the user of the seat belt, the correctness would be close to 100% or substantially 100%. The collision process may then have started already at another portion of the vehicle, e.g., affecting the bumper of the vehicle.

It takes some time to operate the reversible restraint system. Purely as an example, the time period utilized to pull in a seat belt for seat belt retraction, may be between 0.1 s and 0.5 s or between 0.2 s and 0.4 s. Purely as another example, the time period utilized to perform a pre-crash displacement of the seat or a portion thereof, e.g., to change the inclination of the seat back, may be between 0.5 s and 3 s, or between 0.7 s and 1.5 s, or between 0.8 and 1.2 s, with s denoting seconds. Thus, if activating the reversible restraint system too late, it will not be fully functional, or at least sufficiently functional, at the time $T_0$, when the collision is predicted to affect the user of the seat belt.

The reversible restraint system may be activated at a time, when the imminent collision is determined, or it may be activated at some point of time between when the imminent collision is determined and the time $T_0$, when the collision is predicted to affect the user of the seat belt. If activating the reversible restraint system earlier than necessary, it will sometimes be activated although the collision is avoided. This may cause irritation and discomfort to the user of the seat.

It is consequently advantageous to find an appropriate time of activation of the reversible restraint system. According to the disclosure as described herein, the appropriate time is found by means of the determined current length of pulled out seat belt. It is in general desirable to activate the reversible restraint system as late as possible, but yet not so late that the reversible restraint system is not ready, or at least sufficiently operable, at the time, when the collision is predicted to affect the user of the seat belt. It may e.g., be acceptable that the seat belt is not fully refracted, although it is desirable that it is fully retracted when the collision affects the user of the seat belt in order to give the best protection possible.

The current length of pulled out seat belt may be determined by measuring the rotation of a retractor spool being used for storing the seat belt. The current length of pulled out seat belt may be determined continuously or repeatedly. Thereby, there is always a representative value available. The current length may for example be determined at least every second, preferably at least every 1/10 of a second and most preferably every 1/100 of a second.

As an alternative or a complement, the current length of pulled out seat belt may be determined by determining the shape of the seat occupant and/or the position of the seat occupant in relation to the seat, e.g., by means of a camera system or an IR camera system, and thereby indirectly determine the current length of pulled out seat belt. It is also possible to use a camera system to directly detect where the seat belt is located and hence determine its pulled out length.

The reversible restraint system may form part of a seat arrangement comprising the seat. The reversible restraint system may in that case comprise the retractor for the seat belt associated to the seat and/or the seat back inclination adjustment arrangement. The reversible restraint system is in that case associated to the seat.

Other reversible restraint systems do not form part of the seat arrangement. Purely as an example, a reversible restraint system may be used to adjust the position of the steering wheel, to adjust the position of a pedal and/or to adjust the position of the dashboard in relation to the seat occupant.

As mentioned above, the reversible restraint system may comprise a seat belt refractor. The retractor utilizes a retraction force to pull the seat belt back in case of a collision and/or a risk situation being detected, i.e., a situation of danger or potential danger. The risk situation may be that a collision is imminent or that a driver of the vehicle has lost control of the vehicle. It is then desirable to move the seat occupant back to a more favorable position against the seat back, e.g., in case the seat occupant is leaning forwards. The more the seat occupant leans forwards, the greater length of belt is pulled out.

The retraction force should be differentiated from a pre-tension force used to keep the seat belt tensioned, when the seat occupant moves in the seat during normal driving conditions. The refraction force used is normally a number of times higher than the pre-tension force, e.g., at least twice, at least three times, at least five times, at least ten times or at least twenty times higher than the pre-tension force.

As a complement, or an alternative, the reversible restraint system may comprise a seat back inclination adjustment arrangement. It may happen that the seat occupant puts the seat back in a backwards inclined position. In case of a collision, in particular a rear-end collision, it is more favorable that the seat back assumes a more upright position. Hence the seat back inclination adjustment arrangement is arranged to displace the seat back to the more upright position. The more the seat back is inclined backwards, the longer before the predicted collision it is desirable to start displacing the seat back. The degree of inclination of the seat back may be determined by determining the current length of pulled out seat belt or by using a separate sensor. The more the seat back is inclined backwards, the shorter length of seat belt is utilized. The seat back inclination may also be measured by means of a sensor in the seat back or a sensor checking its adjustment arrangement. This is opposite to the above-mentioned case, wherein the more the seat occupant leans forwards, the more the seat belt is pulled out. However, both these cases may be generalized as checking how much the current length of pulled out the seat belt deviates from a goal value representing the seat occupant sitting leaning against the seat back with the seat back in a correct position. The more the actual length of the seat belt deviates from this goal value, the earlier it is desirable to start activation of the reversible restraint system.

Step a) of the method may further comprise determining an excessive length $L_A$ of pulled out seat belt, the excessive length $L_A$ of pulled out seat belt being the difference between the current length L and a minimum length $L_{min}$ of pulled out seat belt, when the seat belt is in use by a current user of the seat belt, and wherein in step d) the length of the selectable time period is a function of the determined excessive length $L_A$ of pulled out seat belt.

The case with excessive length $L_A$ of pulled out seat belt may e.g., occur when the user of the seat belt leans forwards and/or wears fluffy clothes.

The minimum length $L_{min}$ of pulled out seat belt relates to when the seat belt is in use by the current seat occupant and is the smallest determined length of pulled out seat belt for the current seat occupant, which generally corresponds to the seat occupant sitting upright in the seat.

Since the excessive length $L_A$ of pulled out seat belt is determined as a difference, there is no need to measure the absolute length of the seat belt for the current length L and the minimum length $L_{min}$, as long as the determined lengths relate to each other such that a difference may be calculated relating to the pulled out length.

There are a couple of different lengths of the seat belt, which are used herein:
$L_{unused}$ length of unused seat belt, when hanging at the vehicle wall,
$L_{empty}$ length of seat belt when connected but seat empty, $L_{min}$ minimum length of seat belt when in use by the current user, L current length of seat belt when in use, $L_A$ excessive length of seat belt when in use, $L_{max}$ maximum value, physical length of seat belt.

Further the following relationships are valid:

$L_{unused} < L_{empty}$ $L_{empty} < L_{min}$ $L_{min} <= L$ $L <= L_{max}$ $L_A = L - L_{min}$ When the seat belt is not used, it hangs against the wall of the vehicle. It has then an unused length, $L_{unused}$. The length of the seat belt when connected but the seat is empty, $L_{empty}$, represents a lower limit for the minimum value $L_{min}$. The length of the seat belt when connected but the seat is empty, $L_{empty}$, will depend on the position of the seat in relation to the vehicle body. However the lowest value is obtained assuming that the seat is in a rearmost position. Even the thinnest person will add to the length, even when leaning fully back, such that the minimum length $L_{min}$ of pulled out seat belt is always larger than $L_{empty}$, as soon as the seat is used and the seat occupant utilizes the seat belt.

The current length L for a particular seat occupant of the seat belt may vary between $L_{min}$ and $L_{max}$. The lowest value, the minimum value $L_{min}$, is obtained when the seat occupant leans against the seat back. The current length L increases, when the seat occupant leans forwards and decreases when the seat occupant leans backwards. A large and/or thick seat occupant will have longer lengths as regards minimum length $L_{min}$ and current length L than a small or thin seat occupant. The lengths are also influenced by the clothes worn by the seat occupant. Purely as an example a thick winter jacket will add more to the length than a T-shirt. The maximum length $L_{max}$ depends on the physical length of the seat belt and tells how far the seat belt can maximally be pulled out.

The lengths relate to the amount of seat belt being pulled out from e.g., a storage magazine for the seat belt. The portion of the seat belt, which is currently not in use, may e.g., be stored as wound up on a spool in a retractor.

The current length L of pulled out seat belt may be determined continuously or repeatedly. Thereby, there is always a representative value available. The current length L may for example be determined at least every second, preferably at least every 1/10 of a second and most preferably every 1/100 of a second.

Also the minimum length $L_{min}$ may be determined continuously or repeatedly. This may be advantageous, since it may otherwise be difficult to determine for the individual seat occupant how long time it will take until the seat occupant leans backwards against the seat back. Further, also when the seat occupant leans against the seat back, the seat belt may move a little over the body of the seat occupant, and air may be pressed out of the clothes. The used length of the seat belt thereby slowly decreases and new values of the minimum length $L_{min}$ may successively be provided. A representative value of the minimum length $L_{min}$, which approximates the true value, will in some cases not be determined until after the seat occupant has settled into the seat, the air has been pressed out of the clothes, etc.

The minimum length may be determined by determining the current length L a plurality of times, and determining the minimum length $L_{min}$ of pulled out seat belt as a minimum value of the determined plurality of current lengths L of pulled out seat belt. In that case, also the minimum length $L_{min}$ may have a varying value, e.g., being determined as the lowest value so far, e.g., since the particular seat occupant buckled up in the seat.

In order to avoid false detections, it may be required that at least a number measured lengths, e.g., at least two, or at least two consecutive values, are below the currently determined minimum length $L_{min}$, before the minimum length $L_{min}$ is set to a new value.

As an alternative, or a complement, the minimum length $L_{min}$ may be determined by recalling it from a data storage memory, e.g., when recalling data about seat settings for a particular seat occupant. In that case, the recalled minimum length $L_{min}$ would not reflect the actual clothes being worn by the seat occupant, but would form a good approximation based on the stored data. Such a recalled value may also form a starting point for deter-mining the minimum length $L_{min}$ from current length L values, since it is expected that the seat occupant, even if wearing thicker clothes will have an actual minimum length $L_{min}$ being within the stored minimum length $L_{min}$ plus compensation for the thicker clothes.

In order to obtain a representative value of the minimum length $L_{min}$ it is assumed that the seat occupant, at least once, leans against the seat back. It is highly improbable that the seat occupant would not, at least once, lean against the seat back. However, if the seat occupant has not yet leaned against the seat back, the determined value of the minimum length $L_{min}$ will be the best approximation so far. The approximation will be more accurate, the closer the seat occupant has been leaning towards the seat back. In that case, the method will still be useful, even though it is preferred that the seat occupant, at least once, has leaned against the seat back.

The method may comprise to retract at least the determined excessive length $L_A$ of pulled out seat belt. Since the refraction force is higher than the normal pre-tension force, a greater length of seat belt than the excessive length $L_A$ may be retracted, especially if the seat occupant wears fluffy clothes. In that case, the seat belt may be pulled back as far as the retraction force permits. The seat occupant may in such a case be pressed against the seat back by the seat belt.

Further, even if there is too little time to retract the full excessive length $L_A$, it is still useful to retract as much as possible of the excessive length $L_A$ in order to move the seat occupant as close as the available time will permit towards the seat back, before the seat belt user is affected by the collision.

Step a) may comprise determining a position of the seat, to which the seat belt is associated in relation to the vehicle body, or determining a position of a portion of the seat e.g., a seat back, in relation to the vehicle body or to the rest of the seat, and wherein in step d) the length of the selectable time period is a function of the determined current length of pulled out seat belt and the determined position of the seat or seat portion.

The reversible restraint system may be active during the whole selectable time period mentioned above or during a selectable activation time period, lasting during a portion of the selectable time period mentioned above. This corresponds to a stop of activation of the reversible restraint system. The activation time period may be a function of the determined current length of pulled out seat belt.

The reversible restraint system may be operated with a force, wherein a magnitude of the force is a function of the determined current length of pulled out seat belt. The force may vary over the selectable time period. The magnitude of the force may influence the length of the selectable time period. As an alternative, the force may have a predefined level.

In case the reversible restraint system comprises a retractor, the force may be used to retract the seat belt, i.e., being the refraction force mentioned above. The refraction force may, at least partly, increase as a function of the current length of pulled out seat belt. This means that a higher force will be used if the seat occupant is far from the seat back, as compared to if the seat occupant is close to the seat back. The function may be, at least partly, continuously increasing. Alternatively, the function may be stepwise increasing. The whole function may be increasing, or only part of it may be increasing while another part or other parts is/are constant.

In case the reversible restraint system comprises an adjustment arrangement for the seat or a portion thereof, e.g., the seat back, the force may be used to reposition the seat or the portion thereof in order to obtain a more favorable position of the seat occupant. The force may then be higher the further away the seat or the portion thereof is from a favorable position.

The method may optionally further comprise determining if a seat occupant is present in a seat, to which the seat belt is associated, the seat belt only being retracted, if it is determined that a seat occupant is present in the seat.

If it is determined that there is no seat occupant present in the seat, there is no need to determine any lengths or to apply a retraction force. Sometimes, a bag or similar can be put in a seat and attached by applying the seat belt through e.g., a handle of the bag. Thereby, it can be avoided that the bag is thrown around in the vehicle in case of a sudden speed change of the vehicle. It may in such a case be favorable to anyway retract the seat belt, although the seat is occupied by an object, and not a person. The term seat occupant as used herein is thus not restricted to human beings, but may also include other objects or animals occupying the seat.

The method may further optionally comprise determining if the seat belt is buckled up and the current length of pulled out seat belt, and optionally the excessive length of pulled out seat belt, may be determined since it was determined last time that the seat belt was buckled up.

According to a standard configuration of the seat belt, there is a first belt portion running across the torso of the seat occupant and a second belt portion running over the hip of the seat occupant. If the seat occupant leans forwards or the seat back is inclined backwards, it is primarily the length of the first belt portion, which is influenced. The above-mentioned method may therefore be performed in relation to the length of first belt portion only, or in relation to the lengths of the first and second belt portions.

In a second aspect of the present disclosure, there is provided a safety arrangement of a vehicle. The safety arrangement comprises
  a seat belt,
  a first sensor, for directly or indirectly determining a current length of pulled out seat belt,
  a system for detecting a collision or an imminent collision involving the vehicle,
  a reversible restraint system, and
  a processor.
  The processor is adapted to
  predict a time $T_0$ when the collision is predicted to affect a user of the seat belt,
  determine a selectable time period before the time $T_0$, and
  activate the reversible restraint system at the selectable time period before the time $T_0$, wherein a length of the selectable time period is a function of the determined current length of pulled out seat belt.

The first sensor may directly or indirectly measure a parameter corresponding to the current length of the seat belt being pulled out. The first sensor may e.g., directly measure the current length. Alternatively, it may measure the rotation of a retractor spool being used for storing the seat belt. It may e.g., measure the angular position of the refractor spool. Such sensors are known to the skilled person from e.g., the patent document US 2007/0114768 A1. As an alternative or a complement, the current length of pulled out seat belt may be determined by determining the shape of the seat occupant and/or the position of the seat occupant in relation to the seat, e.g., by means of a camera system or an IR camera system, and thereby indirectly determine the current length of pulled out seat belt. It is also possible to use a camera system to directly detect where the seat belt is located and hence determine its pulled out length.

The system for detecting a collision or an imminent collision involving the vehicle, i.e., the collision detection system, may comprise a remote sensor system, e.g., a camera system, an IR camera system, a radar, a lidar, an ultrasonic sensor system, an accelerometer and/or a vehicle dynamics sensor, such as a steering wheel angle sensor. As an alternative, or in addition, the system may comprise a contact sensor system, e.g., a piezoelectric sensor.

The reversible restraint system may be triggered directly by the remote sensor system detecting an imminent collision or another risk situation, and/or the triggering may be based on the actual contact between an object and the vehicle, i.e., an actual collision. The collision detection system is connected to the processor. One or more sensors may be used by the collision detection system. The sensor may be located at various positions in the vehicle depending on type of sensor, both on the outside of the vehicle and within the vehicle. They may e.g., be located at a front of the vehicle intended to detect or predict a front-end collision, or at the rear-end intended to detect or predict a rear-end collision.

The reversible restraint system may be adapted to be related to a seat, to which the seat belt is associated, or to a portion of the seat.

The reversible restraint system may be related to the seat belt, e.g., the reversible restraint system comprising a refractor for the seat belt. The retractor may be electrical, e.g., utilizing an electrical motor, and be electronically controlled by the processor, e.g., by sending an electrical signal. Alternatively, the retractor may be mechanical. Such reversible retractors may be used more than once and do not have to be replaced after use as pyro-technically initiated retractors would have to be.

The restraint system as used in the safety arrangement as described herein is reversible. This is in particular advantageous, if the restraint system would be activated in case of a risk situation, such as an imminent collision, since in that case the restraint system may be easily reset if it was activated unnecessarily, e.g., the collision was actually avoided or was less severe than anticipated. Thereby, a threshold for activating the restraint system may be set lower than for a non-reversible restraint system, since there is only a little effort, and/or cost, involved to reset it. The reversible restraint system may thus be activated already when a risk for a collision is detected. If instead using an irreversible restraint system, such as a one initiated by a pyrotechnical means, the vehicle would need to go to e.g., a garage or a workshop to replace the pyrotechnical means, thus resulting in cost and effort.

The first sensor is adapted for determining a current length of pulled out seat belt. In that case, the processor may be adapted to determine an excessive length of pulled out seat belt as the difference between the current length of pulled out seat belt and a minimum length of pulled out seat belt, when the seat belt is in use by the current user, as is described above. The length of the selectable time period is then a function of the deter-mined excessive length of pulled out seat belt, which in turn is a function of the determined current length. The excessive length may be caused by the seat occupant leaning forwards and/or wearing fluffy clothes.

The safety arrangement may further comprise a second sensor for determining a position of a seat, to which the seat belt is associated, or for determining a position of a portion of the seat, e.g., an inclination of a seat back. The reversible restraint system may comprise a seat position adjustment arrangement and/or a seat back inclination adjustment arrangement. The seat back inclination may be measured by means of a sensor in the seat back or a sensor sensing the seat back inclination adjustment arrangement.

There is no need to include a seat position detector in the safety arrangement according to the disclosure, since the current length of the pulled out seat belt may be determined without using the position of the seat, e.g., by utilizing the excessive length of pulled out seat belt, as is described above. However, it is an option to include a seat position detector as the second sensor, which second sensor may be used also for other tasks, such as determining the distance between the seat occupant and an airbag in the steering wheel or dashboard.

A seat back inclination sensor may be used to determine the degree of inclination of the seat back in relation to a squab of the seat.

The safety arrangement may further comprise a seat belt usage sensor. The seat belt sensor usage sensor is used to see if the seat belt is buckled up.

The safety arrangement may form a part of a larger system of the vehicle, such as an anti-collision system. The safety arrangement may be associated with a driver-assist system, such that the reversible restraint system may be activated, if it is detected that the driver has lost control of the vehicle, which is an example of a risk situation, since losing control of the vehicle may lead to a collision.

In a third aspect of the disclosure there is provided a vehicle comprising a safety arrangement as described herein.

BRIEF DESCRIPTION OF THE DRAWINGS

Non-limiting embodiments according to the present disclosure will hereinafter be further explained with reference to the appended drawings, wherein.

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by non-limiting embodiments. It should however be realized that the embodiments are included in order to explain principles of the disclosure and not to limit the scope of the disclosure, defined by the appended claims. Furthermore, details from two or more of the embodiments may be combined with each other.

Figure 1:
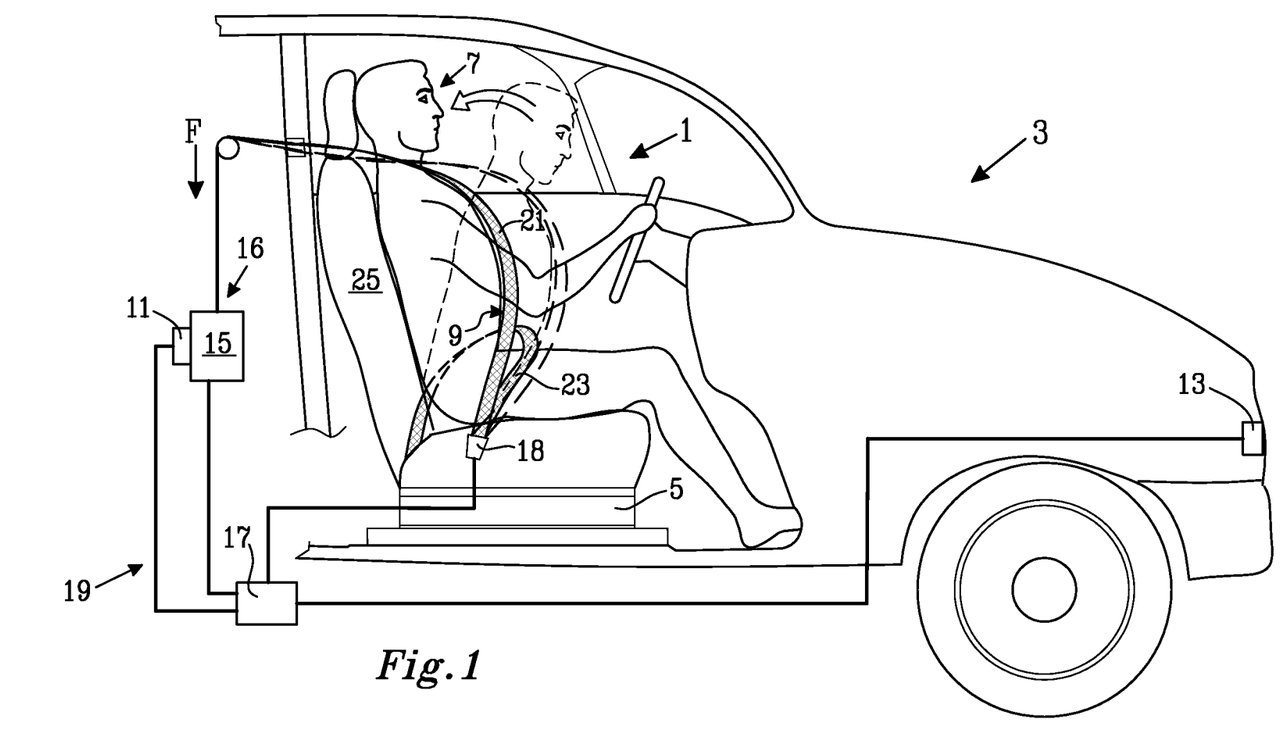
FIG. 1 illustrates a vehicle with a safety arrangement according to a first embodiment of the disclosure.

FIG. 1 schematically illustrates a safety arrangement 1 of a vehicle 3. The vehicle 3 comprises a seat 5, in which a seat occupant 7 is seated and the safety arrangement 1. The seat occupant 7 has buckled up a seat belt 9, being a part of the safety arrangement 1. Hence the seat occupant 7 is a user of the seat belt 9. The safety arrangement 1 further comprises a first sensor 11, a collision detection system 13, a reversible restraint system 15, and a processor 17. The first sensor 11 is adapted for determining, directly or indirectly, a current length of pulled out seat belt 9. The collision detection system 13 is adapted for detecting an actual collision and/or an imminent collision. The reversible restraint system 15 comprises a retractor 16 for retracting the seat belt 9. The retractor 16 is adapted to retract the seat belt 9 by applying a retraction force F to the seat belt 9, in case of a collision or an imminent collision involving the vehicle 3 being detected by the collision detection system 13. A seat arrangement 19 comprises the seat 5, the seat belt 9 and the retractor 16. As an option, the safety arrangement 1 may also comprise a seat belt usage sensor 18, which is used to detect if the seat belt 9 is buckled up.

In the illustrated embodiment, the first sensor 11 is adapted to determine, directly or indirectly, a current length L of pulled out seat belt, e.g., by measuring the rotation of a retractor spool being used for storing the seat belt 9. An excessive length $L_A$ of pulled out seat belt is calculated as the difference between the current length L of pulled out seat belt and a minimum length $L_{min}$ of pulled out seat belt, when the seat belt 9 is in use by the current user, which is further described below in conjunction with FIG. 3. The calculations are made in the processor 17. Data about current length L are then sent from the first sensor 11 to the processor 17.

The collision detection system 13 may comprise a remote sensor system, e.g., a camera system, an IR camera system, a radar, a lidar, an ultrasonic sensor system, an accelerometer and/or a vehicle dynamics sensor, such as a steering wheel angle sensor. As an alternative, or in addition, the collision detection system 13 may comprise a contact sensor system, e.g., a piezoelectric sensor. The retraction of the seat belt 9 may be triggered directly by the remote sensor system detecting an imminent collision, and/or the triggering may be based on the actual contact between an object and the vehicle 3, i.e., an actual collision. The collision detection system 13 is connected to the processor 17. One or more sensors may be used by the collision detection system 13. They may be located at various positions in the vehicle 3 depending on type of sensor, both on the outside of the vehicle 3 and within the vehicle 3, e.g., at a front of the vehicle 3 as is illustrated or at a rear end of the vehicle 3.

Figure 4:
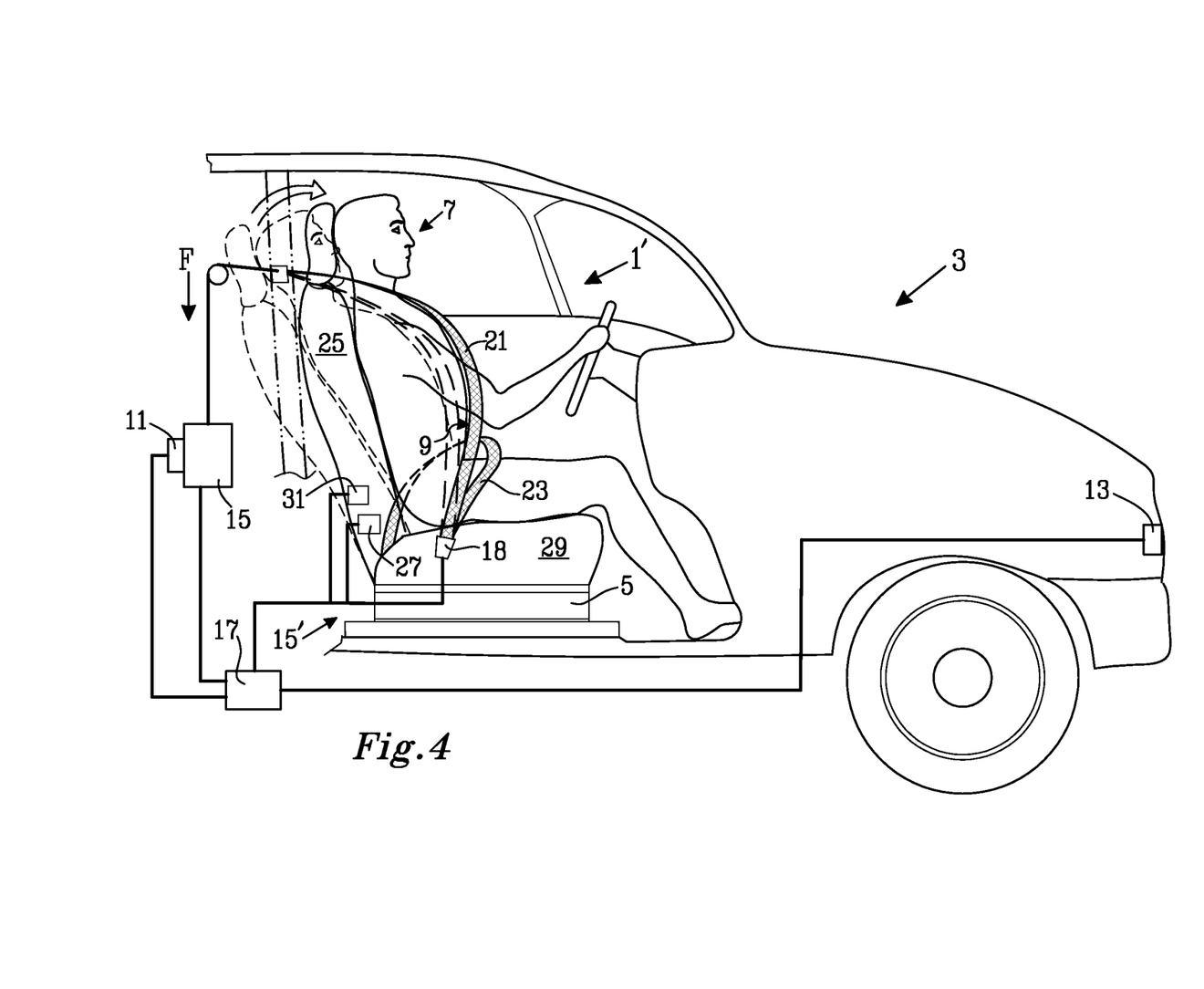
FIG. 4 illustrates a vehicle with a safety arrangement according to a second embodiment of the disclosure.

The seat belt 9 is intended to protect the seat belt user 7 in case of a collision involving the vehicle 3, but there is also provided at least one reversible restraint system 15 in the vehicle 3, which reversible restraint system 15 may cooperate with the seat belt 9 to protect the seat occupant 7 or which may function independently of the seat belt 9. The reversible restraint system 15 may comprise the seat belt retractor 16, as illustrated in FIG. 1, or a seat back inclination adjustment arrangement 27, as illustrated in FIG. 4.

Both of these are associated to the seat 5, i.e., the reversible restraint system 15 is intended to be used by an occupant 7 of that seat 5. As an alternative, or a complement, the reversible restraint system may function independently of the seat. Purely as an example, a reversible restraint system may be used to adjust the position of the steering wheel, to adjust the position of a pedal and/or to adjust the position of the dashboard in relation to the seat occupant.

The processor 17 is adapted for predicting a time $T_0$, a point in time when the collision is predicted to affect a user 7 of the seat belt 9, for determining a selectable time period $\Delta_1$ before the time $T_0$, and for activating a reversible restraint system at the selectable time period before the time $T_0$. See FIG. 2. The length of the selectable time period $\Delta_1$ is a function of the determined current length of pulled out seat belt 9. The collision may affect a part of the vehicle 3, e.g., a bumper, before the time $T_0$. The selectable time period $\Delta_1$ starts at the time $T_1$ and lasts until the time $T_0$. The reversible restraint system may be active during the whole selectable time period $\Delta_1$ or during a selectable activation time period $\Delta_2$, lasting between the time $T_1$ and a time $T_2$ corresponding to a stop of activation of the reversible restraint system. The activation time period $\Delta_2$ may also be a function of the determined current length of pulled out seat belt 9.

The embodiment illustrated in FIG. 1 illustrates indicated by dashed lines a situation when the seat occupant 7 is leaning forwards. Therefore the current length of pulled out seat belt 9 is longer than if the seat occupant 7 would sit in a normal position, indicated by continuous lines. According to a standard configuration of the seat belt 9, there is a first belt portion 21 running across the torso of the seat occupant 7 and a second belt portion 23 running over the hip of the seat occupant 7. If the seat occupant 7 leans forwards, it is primarily the length of the first belt portion 21, which is increased. In case of a collision, it is favorable that the seat occupant 7 is positioned with his/her back against a seat back 25. Therefore, in case of a collision and/or an imminent collision being detected by the collision detection system 13, the processor 17 sends a signal to the retractor 16 to retract the seat belt 9 by applying the retraction force F.

Figure 2:
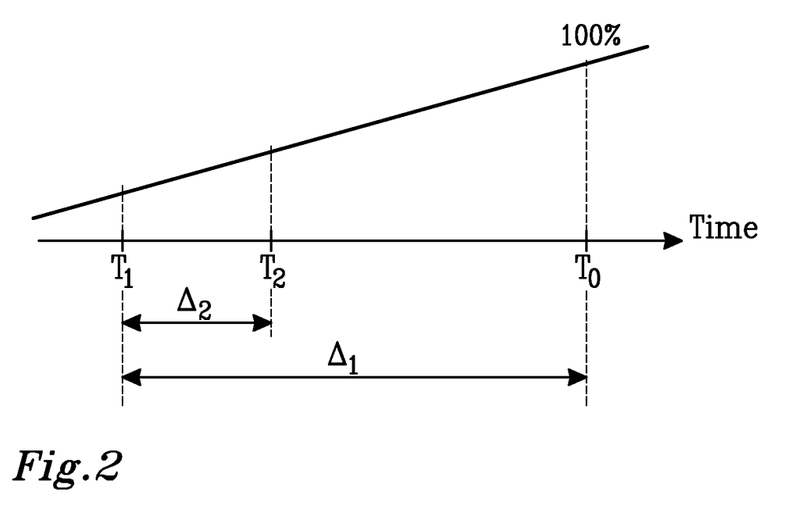
FIG. 2 illustrates schematically correctness of the prediction of a collision as a function of time.

The correctness of the prediction of a collision increases in general the closer to the time $T_0$ the prediction is made. However, the actual shape of the curve illustrating the correctness as a function of time may vary, e.g., dependent on sensor type and/or environmental conditions. FIG. 2, as an example illustrates a linearly increasing correctness. A late activation of the reversible restraint system reduces the risk of activating it incorrectly. If waiting until the time $T_0$ is reached, i.e., until the collision is actually affecting the user of the seat belt, the correctness would be close to 100% or substantially 100%.

Normally it takes some time to operate a component of a reversible restraint system. Purely as an example, the time period utilized to pull in a seat belt, e.g., for seat belt retraction, may be between 0.1 s and 0.5 s or between 0.2 s and 0.4 s. Purely as another example, the time period utilized to perform a pre-crash displacement of the seat or a portion thereof, e.g., to change the inclination of the seat back, may be between 0.5 s and 3 s, or between 0.7 s and 1.5 s, or between 0.8 and 1.2 s, with s denoting seconds. Thus, if activating the reversible restraint system too late, it will not be fully or at least sufficiently functional at the time $T_0$, when the collision is predicted to affect the user of the seat belt.

The reversible restraint system 15 may be activated at a time, when the imminent collision is determined, or it may be activated at some point of time between when the imminent collision is determined and the time $T_0$, when the collision is predicted to affect the user 7 of the seat belt 9. If activating the reversible restraint system 15 earlier than necessary, it will sometimes be activated although the collision is avoided. This may cause irritation and discomfort to the user 7.

It is consequently advantageous to find an appropriate time of activation of the reversible restraint system 15. According to the disclosure as described herein, the appropriate time is found by means of the determined current length of pulled out seat belt 9. As explained above, it is in general desirable to activate the reversible restraint system as late as possible, but yet not so late that the reversible restraint system is not ready or at least sufficiently operable at the time, when the collision is predicted to affect the user of the seat belt. It may e.g., be acceptable that the seat belt 9 is not fully retracted, although it is desirable that it is fully retracted at the time T0, when the collision affects the user 7 of the seat belt 9, in order to give the best protection possible.

In addition to finding an appropriate time of activation of the reversible restraint system, a magnitude of the force used to operate the reversible restraint system may be selected, e.g., based on the determined current length of pulled out seat belt. As an alternative, the force may have a predefined level.

Figure 3:
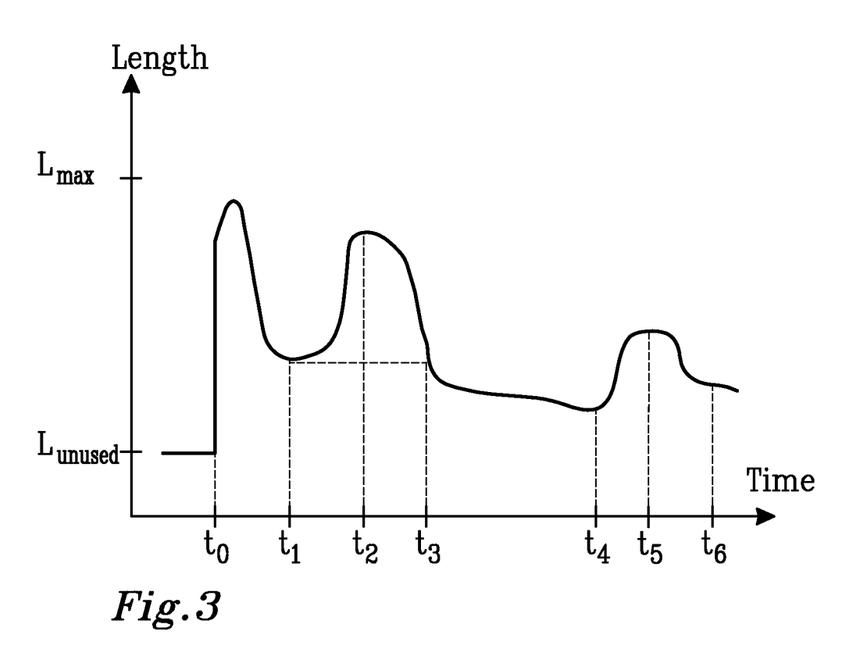
FIG. 3 illustrates current length L of pulled out seat belt as a function of time.

FIG. 3 illustrates an example of a series of measurements made of current length L of the seat belt 9 as a function of time. The current length L is repeatedly measured such that the series in practice can be plotted as a continuous curve. An excessive length $L_A$ of pulled out seat belt is calculated as the difference between the current length L of pulled out seat belt and a minimum length $L_{min}$ of pulled out seat belt, when the seat belt 9 is in use by the current user.

When the seat belt 9 is not used, it hangs against the wall of the vehicle 3. It has then an unused length $L_{unused}$. At the time t0 the seat occupant 7 buckles up, a signal is sent from the seat belt usage sensor 18 to the processor 17. The seat occupant 7 is then seated in the seat 5 and has pulled out the seat belt 9.

The minimum length $L_{min}$ is determined as the hitherto lowest value of the current length L, since the last time the seat belt 9 was buckled up. The value of the minimum length $L_{min}$ thus sinks gradually until the time t1, when the seat occupant 7 leans back against the seat back 25 of the seat 5. Thereafter, the seat occupant 7 leans forwards, interval t1 to t2, and the values of the current length L increases. Hence the minimum length $L_{min}$ remains unchanged. However, the excessive length $L_A$ of pulled out seat belt increases when the seat occupant 7 leans forwards.

The current length L is continuously monitored as long as the seat belt 9 is buckled up. As soon as the current length L is less than the minimum length $L_{min}$, a new value for the minimum length $L_{min}$ is provided, in FIG. 3 after the time t3. Between time $t_3$ and $t_4$ the seat occupant 7 sits rather still leaning against the seat back 25. However, as the seat belt 9 moves a little over the body of the seat occupant 7, and as air is pressed out of the clothes, the current length L slowly decreases and new updated values of the minimum length $L_{min}$ are provided up until the time t4. Then the seat occupant 7 once against leans forwards and the current length L increases. The minimum length $L_{min}$ is thus maintained as it is. After a while, see time t6, the seat occupant 7 once again leans backwards against the seat back 25. However, the current length L is longer than the hitherto determined minimum length $L_{min}$. The minimum length $L_{min}$ is thus not changed.

In the illustrated embodiment of FIG. 1, the excessive length $L_A$ of pulled out seat belt 9 is utilized when determining the current length of pulled out seat belt in order to find an appropriate time of activation of the reversible restraint system, e.g., when activating the retractor 16 of FIG. 1. As an alternative or a complement, the current length of pulled out seat belt 9 may be determined by determining the shape of the seat occupant 7 and/or the position of the seat occupant 7 in relation to the seat 5, e.g., by means of a camera system or an IR camera system, and thereby indirectly determine the current length of pulled out seat belt 9. It is also possible to use a camera system to directly detect where the seat belt 9 is located and hence determine its pulled out length.

FIG. 4 illustrates another example of a safety arrangement 1' according to the disclosure, wherein the reversible restraint system 15' comprises a seat back inclination adjustment arrangement 27 and a second sensor 31 for determining a position of the seat back 25 relative to a squab 29 of the seat 5. The seat back inclination may be measured by means of a sensor in the seat back 25 or a sensor sensing its adjustment arrangement 27. The seat back 25 is inclined backwards, indicated by dashed lines. In case of collision, in particular a rear-end collision, it is more favorable that the seat back 25 assumes a more upright position, indicated by continuous lines. Hence the seat back inclination adjustment arrangement 27 is arranged to displace the seat back 25 to the more upright position in case of a collision. The more the seat back 25 is inclined backwards, the earlier it is desirable to start displacing the seat back 25. The degree of inclination of the seat back 25 may be determined by determining the current length of pulled out seat belt 9, the second sensor 31 in that case coinciding with the first sensor 11. The more the seat back 25 is inclined backwards, the shorter length of seat belt 9 is utilized, hence opposite for the case of FIG. 1, wherein the more the seat occupant 7 leans forwards, the more the seat belt 9 is pulled out. However, both these cases may be generalized as checking how much the current length of pulled out the seat belt 9 deviates from a goal value representing the seat occupant 7 sitting leaning against the seat back 25 with the seat back 25 in an upright position. The more the actual length of the seat belt deviates from this goal value, the earlier it is desirable to start activation of the reversible restraint system 15, 15'.

As for example illustrated in FIG. 4, the vehicle 3 may comprise both a retractor 16, being operated as described above in conjunction with FIG. 1, and a seat back inclination adjustment arrangement 27.

Figure 5:
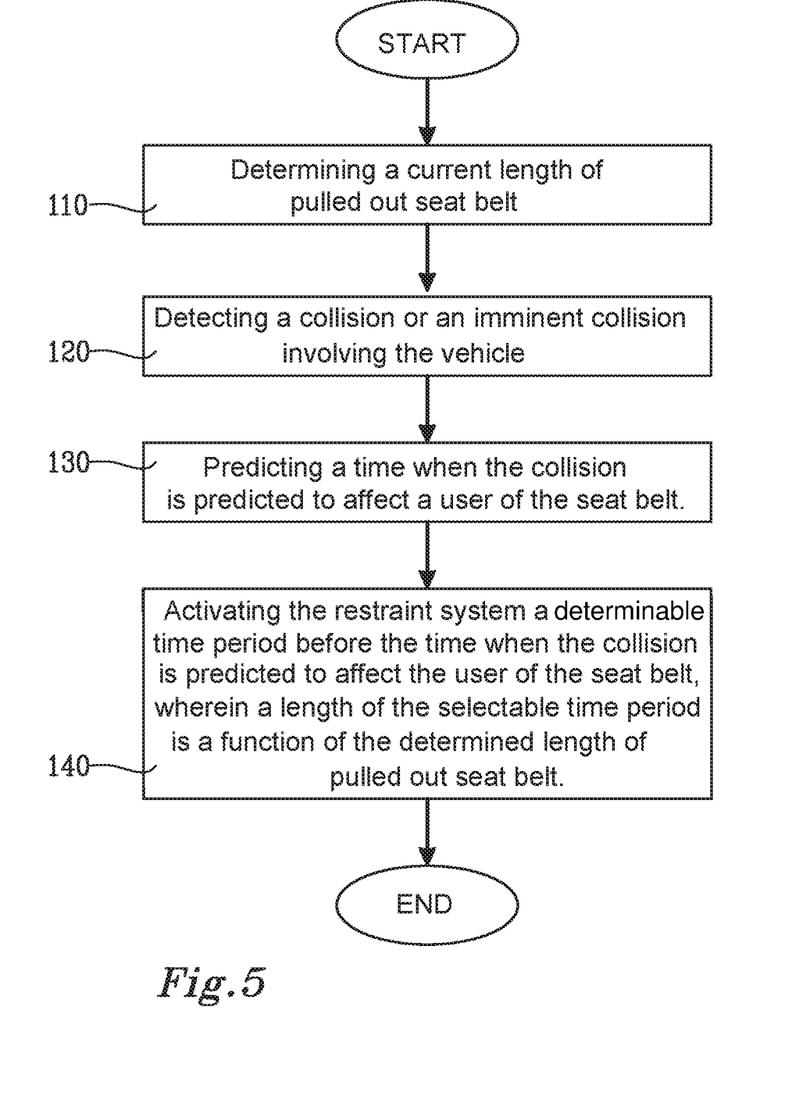
FIG. 5 is a flowchart of a method according to the disclosure.

FIG. 5 is a flowchart of a method according to the disclosure. The method comprises:
110: Determining a current length of pulled out seat belt.
120: Detecting a collision or an imminent collision involving the vehicle.
130: Predicting a time when the collision is predicted to affect a user of the seat belt.
140: Activating the reversible restraint system a selectable time period before the time when the collision is predicted to affect the user of the seat belt, wherein a length of the selectable time period is a function of the determined current length of pulled out seat belt.

The steps of the method are further described above.

As one skilled in the art would understand, the above-mentioned processor 17 may communicate with and/or control operation of any of the various arrangements and systems (e.g., 1, 13, 15, 15', 27). Furthermore, the processor 17 may include or be in communication with one or more storage devices or media including computer readable program instructions that are executable by the processor 17 so that the processor 17 may perform particular algorithms represented by the functions and/or operations described herein. As one skilled in the art would further understand, each of the above-described arrangements and systems (e.g., 1, 13, 15, 15', 27) may also include suitable hardware and/or software, such as one or more processors (e.g., one or more microprocessors, microcontrollers and/or programmable digital signal processors) in communication with one or more storage devices or media including computer readable program instructions that are executable by the one or more processors so that the particular arrangement or system may perform particular algorithms represented by the functions and/or operations described herein. Each arrangement and system may also, or instead, include one or more application specific integrated circuits, programmable gate arrays or programmable array logic, programmable logic devices, or digital signal processors.

Further modifications of embodiments according to the disclosure are feasible within the scope of the appended claims. As such, the present disclosure should not be considered as limited by the embodiments and figures described herein. Rather, the full scope of the disclosure should be determined by the appended claims, with reference to the description and drawings.

What is claimed is:

1. A method for controlling a time of activation of a restraint system in a vehicle, the vehicle including a seat belt associated with a seat and the restraint system, the restraint system being a reversible restraint system, the method comprising:
   a) determining a current length of pulled out seat belt;
   b) detecting a collision or an imminent collision involving the vehicle;
   c) predicting a time when the collision or imminent collision will affect a user of the seat belt; and
   d) activating the reversible restraint system a determined time period before the time when the collision or imminent collision is predicted to affect the user of the seat belt, wherein a length of the time period is a function of the determined current length of pulled out seat belt.

2. The method according to claim 1 wherein the current length of pulled out seat belt is determined continuously or repeatedly.

3. The method according to claim 1 wherein the reversible restraint system forms part of a seat arrangement comprising the seat.

4. The method according to claim 3 wherein the reversible restraint system comprises a retractor for the seat belt associated with the seat and/or a seat back inclination adjustment arrangement.

5. The method according to claim 1 wherein step a) further comprises determining an excessive length of pulled out seat belt, the excessive length of pulled out seat belt being a difference between the current length and a minimum length of pulled out seat belt, when the seat belt is in use by the user of the seat belt, and wherein, in step d), the length of the time period is a function of the determined excessive length of pulled out seat belt.

6. The method according to claim 4 wherein step a) further comprises determining a position of the seat, with which the seat belt is associated, or determining a position of a portion of the seat, and wherein, in step d), the length of the time period is a function of the determined current length of pulled out seat belt and the determined position of the seat or seat portion.

7. The method according to claim 1 wherein the reversible restraint system is active during a determinable activation time period, the activation time period being a function of the determined current length of pulled out seat belt.

8. The method according to claim 1 wherein the reversible restraint system is operated with a force, and wherein a magnitude of the force is a function of the determined current length of pulled out seat belt.

9. The method of claim 1 wherein the reversible restraint system comprises a retractor for the seat belt and a seat back inclination adjustment arrangement that is operable to displace a seat back of the seat from a backwards inclined position to a more upright position, wherein the method further comprises determining degree of inclination of the seat back based on the determined current length of pulled out seat belt, and wherein activating the reversible restraint system comprises activating the retractor to retract a portion of the seat belt, and activating the seat back inclination adjustment arrangement to move the seat back from the backwards inclined position toward the more upright position.

10. A safety arrangement for a vehicle, the safety arrangement comprising:
a seat belt;
a first sensor for directly or indirectly determining a current length of pulled out seat belt;
a system for detecting a collision or an imminent collision involving the vehicle;
a reversible restraint system; and
a processor adapted for predicting a time when the collision or imminent collision will affect a user of the seat belt, for determining a time period before the predicted time, and for activating the reversible restraint system the determined time period before the time, wherein a length of the determined time period is a function of the determined current length of pulled out seat belt.

11. The safety arrangement of claim 10 wherein the processor is adapted for determining the time period before the time.

12. The safety arrangement according to claim 10 wherein the reversible restraint system is adapted to be related to a seat, with which the seat belt is adapted to be associated, or to a portion of the seat.

13. The safety arrangement according to claim 10 wherein the reversible restraint system is related to the seat belt.

14. The safety arrangement according to claim 13 wherein the reversible restraint comprises a retractor for the seat belt.

15. The safety arrangement according to claim 10 wherein the processor is adapted to determine an excessive length of pulled out seat belt as a difference between the current length of pulled out seat belt and a minimum length of pulled out seat belt, when the seat belt is in use by a current user, the length of the time period being a function of the determined excessive length of pulled out seat belt.

16. The safety arrangement according to claim 10 further comprising a second sensor for determining a position of a seat, with which the seat belt is adapted to be associated, or for determining a position of a portion of the seat, and wherein the reversible restraint system comprises a seat position adjustment arrangement and/or a seat back inclination adjustment arrangement.

17. A vehicle comprising a seat and the safety arrangement according to claim 10, wherein the seat belt of the safety arrangement is associated with the seat.

18. The vehicle of claim 17 wherein the processor of the safety arrangement is configured to determine the time period before the time.

19. The vehicle of claim 17 wherein the processor of the safety arrangement is configured to determine an excessive length of pulled out seat belt as a difference between the current length of pulled out seat belt and a minimum length of pulled out seat belt, when the seat belt is in use by the user, the length of the time period being a function of the determined excessive length of pulled out seat belt.

20. The vehicle of claim 17 wherein the safety arrangement further comprises a second sensor for determining a position of the seat, or for determining a position of a portion of the seat, and wherein the reversible restraint system of the safety arrangement comprises a seat position adjustment arrangement and/or a seat back inclination adjustment arrangement.

21. The vehicle of claim 17 wherein the reversible restraint system of the safety arrangement comprises a seat back inclination adjustment arrangement that is operable to displace the seat back from a backwards inclined position to a more upright position, and the safety arrangement is configured to determine degree of inclination of the seat back based on the determined current length of pulled out seat belt.

* * * * *